United States Patent [19]

Bond

[11] 4,280,814
[45] Jul. 28, 1981

[54] DYEING PROCESS AND COMPOSITIONS
[75] Inventor: Gary L. Bond, Kingsport, Tenn.
[73] Assignee: Eastman Kodak Company, Rochester, N.Y.
[21] Appl. No.: 21,756
[22] Filed: Mar. 19, 1979
[51] Int. Cl.$^3$ .......................... D06P 1/62; D06P 1/48
[52] U.S. Cl. ............................................ 8/588; 8/620
[58] Field of Search ............... 8/91, 89 R, 82, 173, 8/588, 561, 620

[56] References Cited

U.S. PATENT DOCUMENTS

| | | | |
|---|---|---|---|
| 1,812,693 | 6/1931 | Hailwood | 8/588 |
| 2,282,724 | 10/1937 | Haynn | 8/82 |
| 3,086,831 | 4/1963 | Robbins | 8/91 |
| 3,100,134 | 8/1963 | Maier et al. | 8/91 |
| 3,153,564 | 10/1964 | Morgan | 8/89 |
| 3,156,520 | 11/1964 | Blaisdell | 8/91 |
| 3,484,180 | 12/1969 | Humphreys et al. | 8/91 |
| 3,546,197 | 12/1970 | Benko | 8/89 |
| 3,583,877 | 6/1971 | Rosenblum | 8/89 |
| 3,769,272 | 10/1973 | Hintz | 8/89 |
| 4,001,202 | 1/1977 | Dilling et al. | 8/173 |
| 4,131,564 | 12/1978 | Dilling | 8/92 |
| 4,153,414 | 5/1979 | Ver Nooy et al. | 8/89 R |

FOREIGN PATENT DOCUMENTS 2322928 4/1974 Fed. Rep. of Germany ........... 8/89 R

Primary Examiner—Joseph L. Schofer
Assistant Examiner—Maria Parrish Tungol
Attorney, Agent, or Firm—Donald W. Spurrell; Daniel B. Reece, III

[57] ABSTRACT

Disperse dye compositions such as powders and pastes containing ammonium lignin sulfonate and an ammonium compound such as ammonium sulfate, acetate or the like, and dyebaths prepared therefrom produce dyeings of high color yield on such fibers as polyester, triacetate, acetate, polyamides, and blends thereof with other natural and synthetic fibers, under adverse conditions such as wide pH variations and the unpredictable effects of various dyebath additives.

8 Claims, No Drawings

DYEING PROCESS AND COMPOSITIONS

This invention concerns dye and dyebath compositions and dyeing procedure which give greatly improved dyeings under a variety of conditions and in the presence of a variety of dyebath additives.

Many disperse dyes, particularly azo and methine dyes, lose color during the dyeing operation, apparently through chemical alteration of the dye molecule by reduction, hydrolysis, or the like, caused by a variety and combination of factors such as changes in pH of the dyebath, temperature changes, the particular types of additives employed e.g., dispersing, sequestering, antifoaming, surfactant and leveling agents, as well as residual fiber processing chemicals including sizes, lubricants and the like. Of particular significance in this regard are the various lignin type dispersing agents such as the sodium salt of sulfonated lignin, and sequestering agents such as the sodium salts of ethylenediaminetetraacetic (EDTA) and nitrilotriacetic acid.

A principal object of the present invention, therefore, is to provide dye compositions and dyebath compositions including the process for preparing the same, which markedly diminishes the loss in color yield and dyeability through such factors as mentioned above.

These and other objects hereinafter appearing have been attained in accordance with the present invention through the discovery that certain ammonium containing compounds in the dye composition, whether powder or paste, in proper concentration, produce dyeings of high color yield on such fibers as polyester, triacetate, acetate, and polyamides, and blends thereof with other natural and synthetic fibers under the aforesaid adverse conditions.

The ammonium compounds particularly useful in the present invention are ammonium lignin sulfonate (ALS) in admixture with one or more of (NH4)2SO4, NH4Cl, NH4Ac, and NH4OH. The ALS may be used in concentrations of from about ¼ to about 4/1 parts by weight ALS/dye, with from about ½ to about 3/1 being preferred. The other ammonium compound, e.g., (NH4)2SO4 may be used in concentrations of from about 1/10 to about 5/1, parts by weight of ammonium compound/dye, with from about 1/5 to about ½ being preferred. The ALS may be added to the crude dye cake preferably for the grinding operation, and e.g., the (NH4)2SO4 may be added preferably for the dilution of either the dried powder or aqueous paste. Conventional additives and auxilliaries such as wetting agents, antifungicides, antifoam agents, suspension aids such as hydroxyethylcellulose, and the like may also be employed to perform their usual functions in the compositions as desired.

The ammonium ligninsulfonate (ALS) components can be ALS, per se, or it can be an ALS containing product derived by the ammonia base wood pulping process. The degree of sulfonation of the lignin may vary for example from about 0.1 to about 10.0 gram moles of sulfur per 1000 grams of lignin, preferably from about 0.5 to about 5.0. The pulping process might employ, for example, a digesting liquor prepared by combining water, ammonia, and sulfur dioxide to form ammonium sulfite or ammonium bisulfite. A preferred pulping process from which the ALS may be obtained is the alkaline or Kraft process which can provide highly purified lignins which may be sulfonated to more selective degrees between, for example, 3.0 and 4.5 moles of sulfur per 1000 unit weight of lignin. The ALS typically is comprised of lignin units having a weight average molecular weight derived, for example, from gel permeation chromatography using dextran standards, of from about 300 to 50,000 or more. Such materials are available as, e.g., "Orzan A" which is a free-flowing powder consisting chiefly of about 40 to 70 percent by weight (dry basis) ALS plus about 10 to 40 percent by weight wood sugars derived from the pulping of wood by the ammonia-base process. The preparation of this and similar material is further described e.g., in U.S. Pat. Nos. 2,786,008, 3,350,258, 3,156,520, 2,865,906, and 2,944,922, incorporated herein by reference. The preferred ALS in a purer form, for example, above about 90% by weight of gross sample, may be obtained by spray drying an aqueous reaction solution of ammonium hydroxide and refined digester liquor from sulfite pulp manufacture. This preferred material contains for example, in percents by weight, nitrogen from about 4 to about 8, carbon from about 30 to about 50, hydrogen from about 3 to about 7, and sulfur from about 5 to about 15. The most preferred ammonium lignin sulfonate contains in percents by weight, nitrogen from about 6 to 7, hydrogen from about 4.5 to 6, carbon from about 35 to 42, and sulfur from about 10 to about 13. A particularly useful material is sold under the tradename REAX 84-A by Westvaco, Chemical Division, Polychemicals Department. Any of the sulfonated lignins may contain other materials such as carbohydrates, phenols, and organic and inorganic compounds and purification of the sulfonated lignin starting material is desirable. The nonsulfonated lignin materials may be removed by various known methods.

In its broad sense, the invention is defined as a dye composition comprising an admixture of finely ground azo or methine type dye component, from about ¼ to about 4/1 parts of ammonium lignin sulfonate/part of dye and from about 1/10 to about 5/1 parts of ammonium compound/part of dye. More particularly, the ammonium compound is one or more of ammonium sulfate, ammonium chloride, ammonium acetate, and ammonium hydroxide in a concentration ratio by weight of total ammonium compound to dye of from about 1/1 to about 3/1.

The dyes to which the present invention is especially applicable are azo dyes and methine dyes in general. These dyes which have an unsaturated linkage susceptible to reduction seem to be assisted most by the present invention. See, for example, U.S. Pat. Nos. 3,728,374; 3,917,604; and 3,349,098 for typical methine dyes. Typical azo dyes are shown in many U.S. Pat. Nos. including 3,816,388; 3,816,390; 3,816,391; 3,816,392; 3,822,246; 3,829,410; 3,878,189; 3,928,311; 4,049,643; 4,052,379; and 4,076,706.

Specific dyes to which the invention is particularly applicable are as follows:

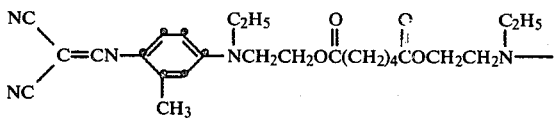

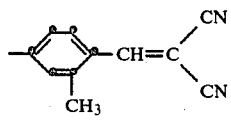

-continued

[Structure: dicyanomethylene compound with C6H5NHC(O)-O-CH2-CH2- substituent on N of dimethyl-methyl oxygen-containing ring with CH=C(CN)2]

[Structure: (NC)2C=CH-C6H4-N(C6H5)2 type]

[Structure: (NC)2C=CH-aryl-N with CH3 groups, (CH3)2, and CH2CH2OCNH-thiophene]

[Structure: similar methine dye with CH2CH2OCNH-phenyl]

[Structure: phthalimide-N-C2H4-N(C2H5)-aryl-CH=C(CN)(CH3)]

Br—C6H3(O2N)—N=N—C6H3(OCH3)(NHCOCH3)—N(CH2CH2OCCH3)2
       NO2                                         ‖
                                                   O

O2N—C6H2(NO2)(CN)—N=N—C6H3(OCH3)(NHCOCH3)—NH—(S thiophene)

O2N—C6H2(CN)(CN)—N=N—C6H3(NHCOCH3)—N(C2H5)(CH2CH2OCH2CH2OC2H5)

O2N—C6H2(NO2)(CN)—N=N—C6H3(OCH3)(NHCOCH3)—NHCH(CH3)C4H9 and

O2N—C6H3(CN)—N=N—C6H3(NHCOCH3)—N(C2H5)(CH2CH2N(succinimide))

The dyebaths may be prepared in conventional manner, e.g., by adding the powder or paste containing the ammonium compounds to an aqueous system which may contain carrier, sequestrant or other additives, and adjusting the pH to about 6.0 with acetic acid. The fabric at a 30/1, weight of water/weight of fabric bath ratio, is then dyed at 100°–130° C. for 30–120 minutes. A useful range of dye bath ratios by weight of fabric being dyed is form about 5/1 to about 100/1, and the concentration of dye in the bath ranges from about 0.01% to about 10.0% by weight of the fabric (owf).

The dye grinds may be prepared by grinding the dye cake with the ammonium lignin sulfonate, water and other desired agents until acceptable particle size, e.g. <50 microns, is obtained for the desired end use. This wet mix may then be dried and diluted with the ammonium compound, e.g. $(NH_4)_2SO_4$, to the desired dye strength. Other conventional diluents and additives may also be employed as supplements. As aforesaid, the paste form is not dried.

In evaluating the present invention, the crude dye-cake is processed with about 1.0 to about 2.5 times its weight, preferably about 2.0 times its weight, of ammonium lignin sulfonate, and ground to a very fine particle size. The wet mix is dried, for example, as shown in U.S. Pat. No. 2,574,597, and the sample is diluted with about 1.5% nondusting oil (e.g. mineral oil), about 0.25% wetting agent and about 30.0% ammonium sulfate, all based on the total weight of dry mix, to give the desired dye strength.

A stock bath of each of the finished dyes set forth above by structural formula was prepared by diluting 0.8 g. of finished dye with 1200 cc. of water and adding 2.5 cc. of a 10% by weight water solution of Versene 100 (sodium salt of EDTA). 300 cc. Portions of this stock bath were pH adjusted to 4 and 6 with acetic acid and to 8 with tetrasodium pyrophosphate. The resulting dyebath was used by dye textured, doubleknit, poly(ethylene terephthalate) samples at the aforesaid pH's of 4, 6 and 8 for 30 minutes at 130° C. The procedure is as follows:

The thoroughly wet out fabric samples were entered into the dyepot containing the above dyebath portions, and the contents emptied into the pressure dyeing container and sealed therein. The pressure containers were placed into a High Temperature Launder-Ometer at 120° F., rotation started, and the temperature raised to 265° F. at approximately 5° F. per minute. Dyeing proceeded at this temperature for 30 minutes and the Launder-Ometer was then cooled to approximately 200° F. The dyeing containers were removed and the dyed fabrics rinsed in hot demineralized water and dried at about 250° F. in a forced air oven. The dyeings were compared to dyeings which were prepared in the same manner but admixed with sodium lignin sulfonate in place of the present ALS/ammonium compound system. The dyebaths containing the present system gave considerably less color loss than the dye processed in the normal manner with sodium lignin sulfonate dispersing agent and diluted with a nonammonium compound such as $Na_2SO_4$.

The invention has been described in detail with particular reference to certain preferred embodiments thereof, but it will be understood that variations and modifications can be effected within the spirit and scope of the invention.

I claim:

1. A dye composition comprising an admixture of finely ground azo or methine type dye component, from about ¼ to about 4/1 parts of ammonium lignin sulfonate/part of dye and from about 1/10 to about 5/1 parts of ammonium compound/part of dye, wherein said ammonium compound is one or more ammonium sulfate, ammonium chloride, ammonium acetate, and ammonium hydroxide.

2. The composition of claim 1 wherein the ammonium compound is one or more of ammonium sulfate, ammonium chloride, ammonium acetate, and ammonium hydroxide in a concentration ratio by weight of total ammonium compound to dye of from about 1/1 to about 3/1.

3. The composition of claim 2 wherein the dye component is one or more of

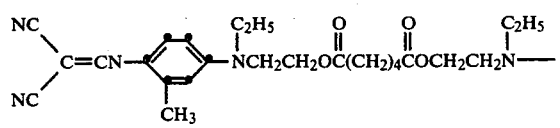

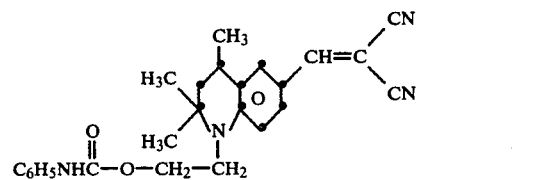

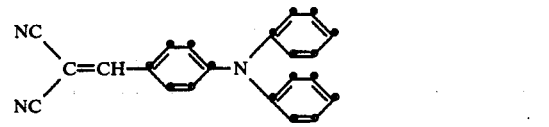

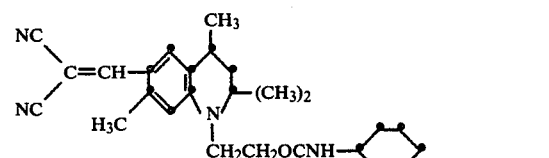

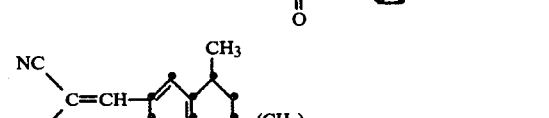

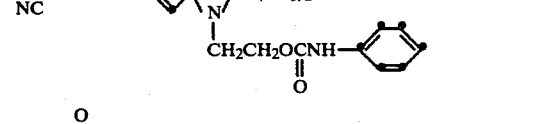

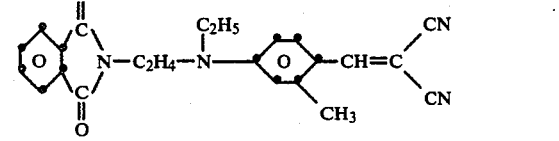

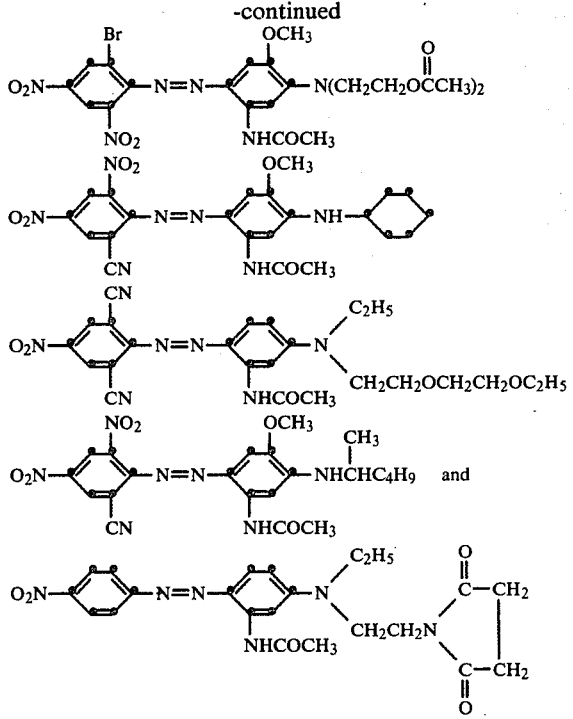

4. The composition of claim 1 wherein the ammonium lignin sulfonate comprises in percents by weight, nitrogen from about 4 to about 8, carbon from about 30 to about 50, hydrogen from about 3 to about 7 and sulfur from about 5 to about 15.

5. The composition of claim 3 wherein the ammonium lignin sulfonate comprises in percents by weight, nitrogen from about 4 to about 8, carbon from about 30 to about 50, hydrogen from about 3 to about 7 and sulfur from about 5 to about 15.

6. The composition of claim 2 wherein the ammonium compound is ammonium sulfate.

7. A dyebath for the dyeing of synthetic fiber material and such material blended with natural fiber material comprising said material immersed in an aqueous bath at a bath ratio of from about 5/1 to about 100/1, owf, said bath containing the dye composition of claim 1 in an amount such that the dye is present in a concentration of from about 0.01 to about 10.0%, owf.

8. A process for exhaust dyeing synthetic fiber material and such material blended with natural fiber material comprising adding to an aqueous disperse dye bath the dye composition of claim 1 in an amount such that the dye is present in a concentration of from about 0.01 to about 10.0%, owf.

* * * * *